US012725269B2

(12) United States Patent
Wang et al.

(10) Patent No.: US 12,725,269 B2
(45) Date of Patent: Sep. 1, 2026

(54) CELL DETECTION METHOD AND APPARATUS, DEVICE, READABLE STORAGE MEDIUM, AND PROGRAM PRODUCT

(71) Applicant: CONTEMPORARY AMPEREX TECHNOLOGY (HONG KONG) LIMITED, Hong Kong (CN)

(72) Inventors: Bingquan Wang, Ningde (CN); Fei Chen, Ningde (CN); Guannan Jiang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 264 days.

(21) Appl. No.: 18/385,938

(22) Filed: Nov. 1, 2023

(65) Prior Publication Data

US 2024/0062381 A1 Feb. 22, 2024

Related U.S. Application Data

(63) Continuation of application No. PCT/CN2023/084653, filed on Mar. 29, 2023.

(30) Foreign Application Priority Data

Aug. 11, 2022 (CN) ......................... 202210960992.7

(51) Int. Cl.
*G06T 7/13* (2017.01)
*G06T 5/90* (2024.01)
(Continued)

(52) U.S. Cl.
CPC .................. *G06T 7/13* (2017.01); *G06T 5/90* (2024.01); *G06T 7/12* (2017.01); *G06V 10/25* (2022.01);
(Continued)

(58) Field of Classification Search
CPC ........ G06V 10/25; G06V 10/44; G06V 10/56; G06V 10/751; G06V 2201/06; G06T 7/13;
(Continued)

(56) References Cited

U.S. PATENT DOCUMENTS

2015/0169969 A1* 6/2015 Honda .................. G06V 20/58 382/103
2021/0398311 A1* 12/2021 Zhang ...................... G06T 7/12
2023/0402054 A1* 12/2023 Yan ....................... G10L 19/018

FOREIGN PATENT DOCUMENTS

CN 102680472 B 4/2014
CN 206489093 U 9/2017
(Continued)

OTHER PUBLICATIONS 18650 battery safety guide: Battery safety guide. Fogstar. (Oct. 27, 2020). https://www.fogstar.co.uk/pages/18650-battery-safety?srsltid=AfmBOop7fJ4pgUqZ9hB4NkQg-K8c15U8HuijfT8U108q_X_VS7Bi1q2l (Year: 2020).*

(Continued)

*Primary Examiner* — Gregory A Morse
*Assistant Examiner* — Stefano Anthony Dardano
(74) *Attorney, Agent, or Firm* — XSENSUS LLP

(57) ABSTRACT

The present application relates to a cell detection method and apparatus, a device, a readable storage medium, and a program product. The method may include: obtaining a first image, where the first image includes a first area where a cell is located; determining a first edge line of the cell based on the first area; and determining a detection result of the cell based on grayscale values corresponding to pixels in a preset area in the first image, where the detection result is used to
(Continued)

indicate whether the cell includes a bottom support sheet, and the preset area is an area within a preset range from the first edge line.

17 Claims, 5 Drawing Sheets

(51) Int. Cl.
*G06T 7/12* (2017.01)
*G06V 10/25* (2022.01)
*G06V 10/56* (2022.01)

(52) U.S. Cl.
CPC .... *G06V 10/56* (2022.01); *G06T 2207/10024* (2013.01)

(58) Field of Classification Search
CPC ......... G06T 7/136; G06T 7/0004; G06T 7/12; G06T 2207/10016; G06T 2207/10024; G06T 2207/10004; G06T 2207/30108; G06T 7/11; G06T 7/90; G06T 7/0008; G06T 2207/10056; G06T 2207/20192; G06T 7/194; G06T 7/50; G06T 7/70; G06T 7/73; G06T 2207/20104; G06T 7/0002; G06T 2207/20024
See application file for complete search history.

(56) References Cited

FOREIGN PATENT DOCUMENTS

| | | | | | |
|---|---|---|---|---|---|
| CN | 107941805 | A | | 4/2018 | |
| CN | 201910162955 | | * | 3/2019 | |
| CN | 210349998 | U | | 4/2020 | |
| CN | 111640131 | A | | 9/2020 | |
| CN | 112241699 | A | | 1/2021 | |
| CN | 111640131 | B | * | 5/2021 | ............ G06V 10/25 |
| CN | 112907518 | A | | 6/2021 | |
| CN | 113390351 | A | | 9/2021 | |
| CN | 113409296 | A | | 9/2021 | |
| CN | 113607742 | A | | 11/2021 | |
| CN | 113947611 | A | | 1/2022 | |
| CN | 113989232 | A | | 1/2022 | |
| CN | 114354615 | A | | 4/2022 | |
| DE | 202022101348 | U1 | | 4/2022 | |
| WO | 2021/169335 | A1 | | 9/2021 | |
| WO | 2021227838 | A1 | | 11/2021 | |
| WO | WO-2023133836 | A1 | * | 7/2023 | ........... G06T 7/0004 |

OTHER PUBLICATIONS

Extended European Search Report issued Jul. 16, 2024 in European Patent Application No. 23790539.3.

International Search Report mailed on May 24, 2023, received for PCT Application PCT/CN2023/084653, filed on Mar. 29, 2023, 7 pages including English Translation.

Notice of the Granting of a Patent Right for an Invention mailed on Jul. 13, 2026, received for CN Application 202210960992.7, 6 pages including English Translation.

The First Office Action mailed Apr. 30, 2026, in Chinese Application No. 202210960992.7, 11 pages including English translation.

Huaiguang Liu et al., "An edge fitting method for the online measurement of lithium battery coating", Opto-Electronic Enginerring, vol. 46, No. 10, published on Nov. 1, 2019, 11 pages including English abstract.

* cited by examiner

CELL DETECTION METHOD AND APPARATUS, DEVICE, READABLE STORAGE MEDIUM, AND PROGRAM PRODUCT

CROSS-REFERENCE TO RELATED APPLICATIONS

The present application is a continuation of International Application No. PCT/CN2023/084653, filed Mar. 29, 2023, which claims priority to Chinese Patent Application No. 202210960992.7, filed on Aug. 11, 2022 and entitled "CELL DETECTION METHOD AND APPARATUS, DEVICE, READABLE STORAGE MEDIUM, AND PROGRAM PRODUCT", each of which is incorporated herein by reference in its entirety.

TECHNICAL FIELD

The present application relates to the technical field of cell detection, and in particular, to a cell detection method and apparatus, a device, a readable storage medium, and a program product.

BACKGROUND ART

In a battery manufacturing process, a bare cell that has been manufactured usually needs to be coated with a film, and then put into a hard casing to complete assembly. To prevent a short circuit of the cell due to direct contact between the cell and the casing, it is often necessary to further mount a bottom support sheet at the bottom of the bare cell when the bare cell is coated with the film, to ensure the subsequent performance stability of the cell.

At present, whether a cell that has undergone a film coating process includes a bottom support sheet often needs to be determined through manual detection. As a result, cell detection is inefficient and labor-consuming.

SUMMARY

Embodiments of the present application provide a cell detection method and apparatus, a device, a readable storage medium, and a program product, to solve the technical problem of inefficiency and high labor consumption of an existing cell detection method.

According to a first aspect, an embodiment of the present application provides a cell detection method, including:

- obtaining a first image, where the first image includes a first area where a cell is located;
- determining a first edge line of the cell according to the first area; and
- determining a detection result of the cell based on grayscale values corresponding to pixels in a preset area in the first image, where the detection result is used to indicate whether the cell includes a bottom support sheet, and the preset area is an area within a preset range from the first edge line.

In this embodiment of the present application, since the bottom support sheet is attached to the cell and usually has a size smaller than the cell, after the first edge line of the cell is determined in the first image, according to a positional relationship between the bottom support sheet and the cell, it is detected, according to the grayscale value of the pixel near the first edge line, whether the cell includes the bottom support sheet. This implements automation of a cell detection process and does not require manual detection, and thus effectively reduces labor consumption and improves detection efficiency.

Optionally, in some embodiments, after the obtaining a first image and before the determining a first edge line of the cell according to the first area, the cell detection method further includes:

- determining, according to grayscale values corresponding to pixels in the first image, first pixels whose grayscale values are greater than or equal to a first threshold; and
- determining a minimum bounding rectangle of the first pixels as the first area.

In this way, the first area where the cell is located may be determined directly based on the grayscale values corresponding to the pixels in the first image, which can effectively save computing resources and improve the efficiency of identifying the first area.

Optionally, in some embodiments, the obtaining a first image includes:

- obtaining an initial image; and
- preprocessing the initial image to obtain the first image.

In this embodiment, in view that an adhesive tape usually exists outside the cell and may interfere with subsequent detection of whether the cell includes a bottom support sheet, the obtained initial image may be preprocessed to reduce interference with cell detection by the adhesive tape and improve the accuracy of a cell detection result.

Optionally, in some embodiments, the preprocessing the initial image to obtain the first image includes:

- performing grayscale processing on the initial image to obtain a grayscale image; and
- adjusting a contrast of the grayscale image to obtain the first image.

In this embodiment, grayscale processing and contrast adjustment may be performed to make a grayscale value of the adhesive tape close to that of the cell, thereby reducing interference of the adhesive tape on cell detection and improving the accuracy of a cell detection result.

Optionally, in some embodiments, the preprocessing the initial image to obtain the first image includes:

- splitting the initial image into three channels of images, where the three channels of images include a red channel image, a green channel image, and a blue channel image; and
- determining any channel image that meets a preset interference condition among the red channel image, the green channel image, and the blue channel image as the first image.

In this embodiment, the initial image may be split into the three channels of images, and a single-channel image with the least interference among the three channels of images is selected as the first image, thereby improving the accuracy of a cell detection result.

Optionally, in some embodiments, the determining a detection result of the cell based on grayscale values corresponding to pixels in a preset area in the first image includes: determining, based on the grayscale values corresponding to the pixels in the preset area in the first image, target pixels whose grayscale values meet a preset condition;

- obtaining a target edge line by fitting the target pixels; and
- determining the detection result of the cell according to a number of target edge lines.

In this embodiment, the target pixel whose grayscale value meets the preset condition may be selected, the target edge line may be obtained by fitting the target pixels, and it may be determined, according to the number of the target edge lines, whether the cell includes a bottom support sheet.

The detection process is simple and effectively saves computing resources and improves the efficiency of cell detection.

Optionally, in some embodiments, the determining, based on the grayscale values corresponding to the pixels in the preset area in the first image, target pixels whose grayscale values meet a preset condition includes:

dividing the preset area along an extension direction of the first edge line to obtain N sub-areas, where each sub-area includes M pixels, and N and M are integers greater than 1; and determining the target pixels from the M pixels in each sub-area, where a difference between a grayscale value of the target pixel and a grayscale value of an adjacent pixel of the target pixel is greater than or equal to a second threshold.

In this way, the preset area may be divided into multiple sub-areas, and the target pixel is selected according to a difference between grayscale values of pixels in each sub-area. The target pixel may be determined more accurately, so that the target edge line may be fit more accurately to further improve the accuracy of a cell detection result.

Optionally, in some embodiments, the obtaining a target edge line by fitting the target pixels includes:

obtaining pixel coordinates of the target pixels;

determining target pixels whose pixel coordinates meet a preset coordinate condition as second pixels; and when a number of second pixels is greater than or equal to a preset number threshold, obtaining the target edge line by fitting the second pixel.

In this embodiment, an interference item in the target pixel may be eliminated based on the pixel coordinates, so as to improve the fitting accuracy of the target edge line and further improve the accuracy of a cell detection result.

Optionally, in some embodiments, the determining the detection result of the cell according to a number of target edge lines includes:

determining, in a case that the number of target edge lines is 0, that the cell includes no bottom support sheet.

In this way, it may be directly determined, based on the number of target edge lines, whether the cell includes a bottom support sheet, the detection process is simple and convenient, and the computing power consumption is low and the efficiency is high.

Optionally, in some embodiments, the determining, in a case that the number of target edge lines is 0, that the cell includes no bottom support sheet includes: inputting, in the case that the number of target edge lines is 0, the first image into a blur detection model to determine whether the first image is a blurry image; and determining, in a case that the first image is not a blurry image, that the cell includes no bottom support sheet.

In this embodiment, in the case that the number of target edge lines is 0, it may be determined whether the first image is a blurry image, and the reliability of the number of target edge lines may be verified, thereby improving the accuracy of a cell detection result.

Optionally, in some embodiments, after the inputting, in the case that the number of target edge lines is 0, the first image into a blur detection model to determine whether the first image is a blurry image, the cell detection method further includes: re-obtaining the first image in a case that the first image is a blurry image.

In this embodiment, if it is detected that the first image is a blurry image, the first image may be re-obtained, and then the target edge line may be identified based on the re-obtained clear first image to obtain an accurate number of target edge lines, which can ensure the accuracy of a cell detection result.

Optionally, in some embodiments, the determining the detection result of the cell according to a number of target edge lines includes:

determining, in a case that the number of target edge lines is 2, that the cell includes a bottom support sheet.

In this way, it may be directly determined, based on the number of target edge lines, whether the cell includes a bottom support sheet, the detection process is simple and convenient, and the computing power consumption is low and the efficiency is high.

Optionally, in some embodiments, the determining, in a case that the number of target edge lines is 2, that the cell includes a bottom support sheet includes: determining, in a case that the number of target edge lines is 2 and at least one target edge line is located in the first area, that the cell includes a bottom support sheet.

In this embodiment, the number of target edge lines and the position between the bottom support sheet and the cell may be jointly used to determine whether the cell includes a bottom support sheet, so as to further ensure the accuracy of a cell detection result.

Optionally, in some embodiments, in a case that the first image includes a first end of the cell, the determining a detection result of the cell according to the number of target edge lines includes:

obtaining a second image in a case that the number of target edge lines is 1, where the second image includes a second end of the cell, and the second end is opposite to the first end; and determining, in a case that the number of target edge lines in the second image is 1, that the cell includes no bottom support sheet.

In this embodiment, by detecting the number of target edge lines in the image at the other end of the cell, a case that the bottom support sheet is misaligned and cannot be detected may be eliminated, and the accuracy of a cell detection result is improved.

Optionally, in some embodiments, after the obtaining a second image in a case that the number of target edge lines is 1, the method further includes:

determining, in a case that the number of target edge lines in the second image is 2, that the cell includes a bottom support sheet.

In this embodiment, the number of target edge lines in the image at the other end of the cell may be detected, so that it may be more accurately determined, based on the numbers of target edge lines at both ends of the cell, whether the cell includes a bottom support sheet.

According to a second aspect, an embodiment of the present application provides a cell detection apparatus, including:

an obtaining module configured to obtain a first image, where the first image includes a first area where a first end of a cell is located;

a first determination module configured to determine a first edge line of the cell according to the first area; and a second determination module configured to determine a detection result of the cell based on grayscale values corresponding to pixels in a preset area in the first image, where the detection result is used to indicate whether the cell includes a bottom support sheet, and the preset area is an area within a preset range from the first edge line.

According to a third aspect, an embodiment of the present application provides an electronic device, including: a processor and a memory storing program instructions, and when the processor executes the program instructions, the method of the first aspect is implemented.

According to a fourth aspect, an embodiment of the present application provides a readable storage medium. The readable storage medium stores program instructions, and when the program instructions are executed by a processor, the method of the first aspect is implemented.

According to a fifth aspect, an embodiment of the present application provides a computer program product. When instructions in the computer program product are executed by a processor of an electronic device, the electronic device is caused to execute the method of the first aspect.

The above description is only an overview of the technical solutions of the present application. In order to more clearly understand the technical means of the present application to implement same according to the contents of the description, and in order to make the above and other objectives, features and advantages of the present application more obvious and understandable, specific implementations of the present application are exemplarily described below.

BRIEF DESCRIPTION OF THE DRAWINGS

In order to illustrate the technical solutions of the embodiments of the present application more clearly, the accompanying drawings required in the description of the embodiments of the present application will be described briefly below. Obviously, the accompanying drawings described below are merely some embodiments of the present application, and for those of ordinary skill in the art, other accompanying drawings may also be obtained from these accompanying drawings without any creative efforts.

Figures 1, 2:
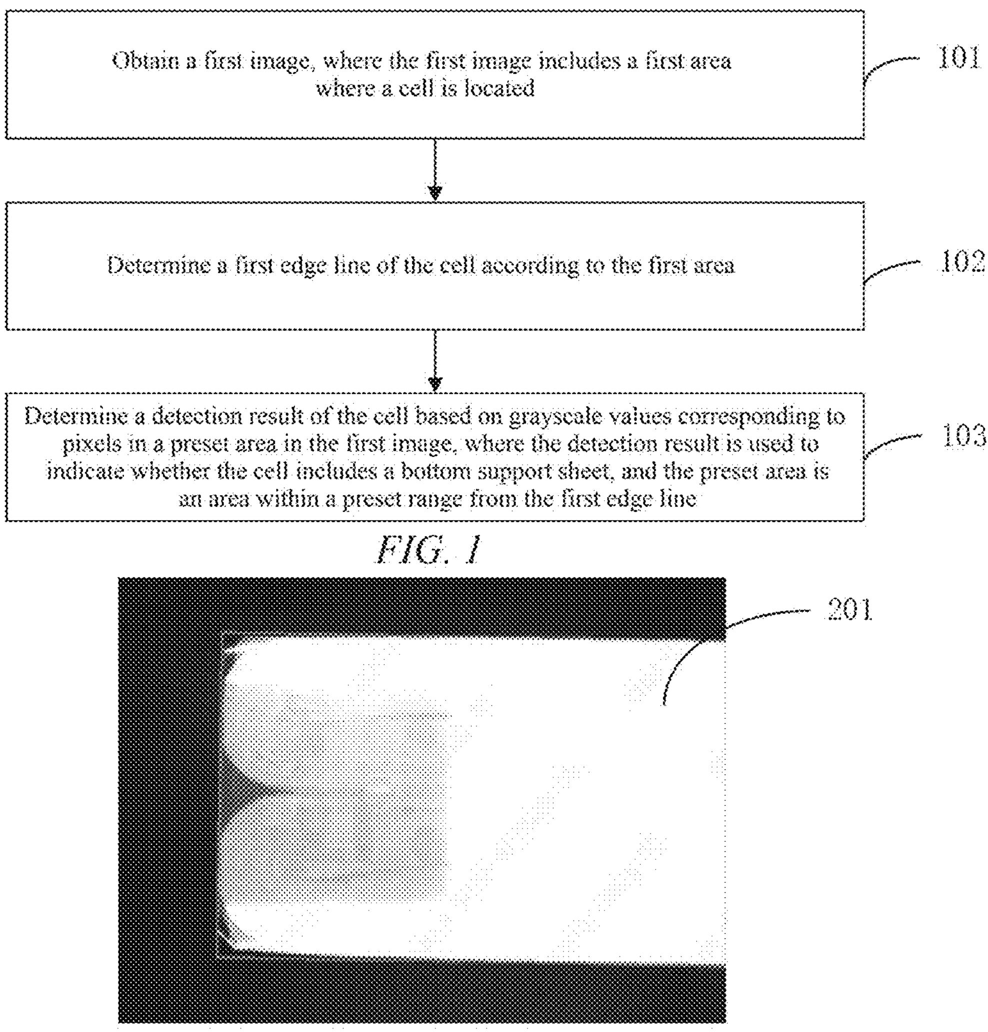
FIG. 1 is a schematic flowchart of a cell detection method according to an embodiment of the present application.
FIG. 2 is a schematic diagram of a first area in a cell detection method according to an embodiment of the present application.

In the drawings, the figures are not necessarily drawn to scale.

DETAILED DESCRIPTION OF EMBODIMENTS

The implementations of the present application will be further described in detail below in conjunction with the accompanying drawings and embodiments. The following detailed description of the embodiments and the accompanying drawings are used to illustrate the principle of the present application by way of example but should not be used to limit the scope of the present application. That is, the present application is not limited to the described embodiments.

In the description of the present application, it should be noted that "a plurality of" means two or more, unless otherwise specified. The orientation or position relationship indicated by the terms "upper", "lower", "left", "right", "inner", "outer", etc. is only for the convenience of describing the present application and simplifying the description, rather than indicating or implying that the device or element referred to must have a particular orientation or be constructed and operated in a particular orientation, and therefore should not be construed as a limitation on the present application. In addition, the terms "first", "second", "third", etc. are used for descriptive purposes only, and should not be construed as indicating or implying the relative importance. The term "perpendicular" does not mean being perpendicular in the strict sense, but within an allowable range of errors. The term "parallel" does not mean being parallel in the strict sense, but within an allowable range of errors.

In the present application, "embodiment" mentioned means that the specific features, structures and characteristics described in conjunction with the embodiments may be included in at least one embodiment of the present application. The phrase at various locations in the description does not necessarily refer to the same embodiment, or an independent or alternative embodiment exclusive of another embodiment. Those skilled in the art should understand, in explicit and implicit manners, that an embodiment described in the present application may be combined with another embodiment.

Embodiments of the present application provide a cell detection method and apparatus, a device, a readable storage medium, and a program product, to solve the technical problem of inefficiency and high labor consumption of an existing cell detection method. The cell detection method provided in the embodiments of the present application is first described below.

Referring to FIG. 1, FIG. 1 is a schematic flowchart of a cell detection method according to an embodiment of the present application. The cell detection method may include the following steps:

Step 101: Obtain a first image, where the first image includes a first area where a cell is located.

Step 102: Determine a first edge line of the cell according to the first area.

Step 103: Determine a detection result of the cell based on grayscale values corresponding to pixels in a preset area in the first image, where the detection result is used to indicate whether the cell includes a bottom support sheet, and the preset area is an area within a preset range from the first edge line.

In this embodiment of the present application, the first image may be obtained, the first edge line of the cell and the preset area within the preset range from the first edge line in the first image may be determined according to the first area in the first image where the cell is located, then it is determined, based on the grayscale values corresponding to the pixels in the preset area, whether the bottom support sheet is detected near the first edge line, and then the detection result of the cell may be determined, that is, whether the cell includes a bottom support sheet. In this way, since the bottom support sheet is attached to the cell and usually has a size smaller than the cell, after the first edge line of the cell is determined in the first image, according to a positional relationship between the bottom support sheet and the cell, it is detected, according to the grayscale value of the pixel near the first edge line, whether the cell includes the bottom support sheet. This implements automation of a cell detection process and does not require manual detection, and effectively reduces labor consumption and improves detection efficiency.

In step 101, the first image may be obtained, where the first image may be an image obtained by an image acquisition apparatus by photographing the cell. It may be understood that the first image may include a photograph of at least one end of the cell.

After the first image is obtained, the first area in the first image where the cell is located may be identified. For example, the first image may be input to a pre-trained object detection network, and the first area may be identified through feature detection, semantic detection, and other means. Pixels to which the cell belongs may also be identified based on the grayscale values of pixels in the first image, and then the first area in the first image may be determined.

In step 102, after identifying the first area in the first image where the cell is located, the first edge line of the cell may be determined, and the first edge line may be used to represent a position of one end of the cell in the first image.

In step 103, the area within the preset range from the first edge line in the first image may be determined as the preset area, and the preset range may be set according to actual conditions, which is not specifically limited herein. The preset area may represent an area near one end of the cell.

It may be understood that the film is usually coated on the outside of the cell, the bottom support sheet is attached to the outside of the cell, and a size of the bottom support sheet is usually smaller than that of the cell. Based on such a positional relationship, the preset area may be detected to determine whether the cell coated with the film includes a bottom support sheet.

For example, it may be determined, based on the grayscale values corresponding to the pixels in the preset area, whether the cell includes a bottom support sheet. For example, a grayscale value range corresponding to an area of the bottom support sheet may be determined according to the actual case, pixels in the preset area whose grayscale values meet the grayscale value range corresponding to the area of the bottom support sheet are determined, then it is determined whether an area of these pixels meets a positional relationship of the bottom support sheet, for example, whether the area is located in the first area, and then it may be determined whether the cell includes a bottom support sheet.

For another example, it may also be detected whether there is a target edge line in the preset area. It may be understood that the target edge line is other edge lines different from the first edge line of the cell. When there is the target edge line, it may be determined, according to the position of the target edge line, whether the cell includes a bottom support sheet. For example, since the size of the bottom support sheet is usually smaller than that of the cell, when the target edge line is located in the first area, it may be considered that the target edge line is the edge line of the bottom support sheet, and it may be considered that the cell includes a bottom support sheet.

For another example, when it is detected that there is the target edge line in the preset area, it may also be determined, according to the number of target edge lines, whether the cell includes a bottom support sheet. For example, since there are usually bottom support sheets and films outside the cell, when two target edge lines are detected in the preset area, it may be considered that one target edge line is the edge line of the film and the other target edge line is the edge line of the bottom support sheet. Therefore, it may be considered that the cell includes a bottom support sheet.

Optionally, in some embodiments, after step 101 and before step 102, the cell detection method may further include the following steps:

- determining, according to grayscale values corresponding to pixels in the first image, first pixels whose grayscale values are greater than or equal to a first threshold; and
- determining a minimum bounding rectangle of the first pixels as the first area.

It may be understood that, as shown in FIG. 2, the cell is often the brightest area (white) in the first image, and based on this feature, first pixels whose grayscale values are greater than or equal to the first threshold in the first image are determined as a pixel to which the cell belongs, then the minimum bounding rectangle is made according to the area where the first pixel is located, and the minimum bounding rectangle may be determined as the first area 201 of the cell. It may be understood that a length of the first edge line of the cell may be that of a side of the minimum bounding rectangle.

In this way, the first area where the cell is located may be determined directly based on the grayscale values corresponding to the pixels in the first image, which can effectively save computing resources and improve the efficiency of identifying the first area.

Optionally, in some embodiments, step 101 may include the following steps:

- obtaining an initial image; and
- preprocessing the initial image to obtain the first image.

It is understandable that after the cell is coated with a film, it is often necessary to glue the cell to prevent the film from falling off. Therefore, there is often an adhesive tape outside the cell, which may interfere with the subsequent detection of whether the cell includes a bottom support sheet. This leads to an inaccurate cell detection result.

Based on this, the initial image may be obtained first, and then the initial image is preprocessed, for example, channel splitting and grayscale processing to obtain the first image, so as to improve the interference of the adhesive tape on the cell detection and improve the accuracy of a cell detection result.

Optionally, in some embodiments, the preprocessing the initial image to obtain the first image may include the following steps:

- performing grayscale processing on the initial image to obtain a grayscale image; and
- adjusting a contrast of the grayscale image to obtain the first image.

Figure 3:
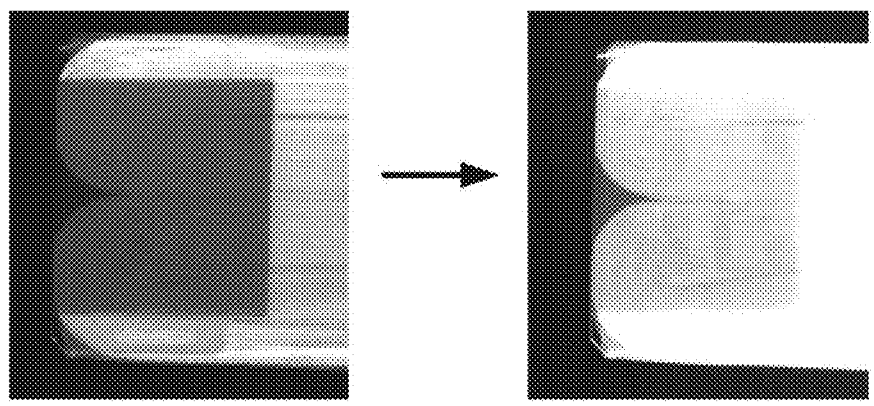
FIG. 3 is a schematic diagram of a state of preprocessing a first image in a cell detection method according to an embodiment of the present application.

In this embodiment, the initial image obtained by the image acquisition apparatus by photographing the cell may be a color image, and grayscale processing may be first performed on the initial image to obtain a grayscale image. In the grayscale image, the adhesive tape usually is a dark area. To reduce interference of this area on the subsequent detection of whether the cell includes a bottom support sheet, as shown in FIG. 3, the contrast of the grayscale image can be enhanced so that the entire grayscale image is brightened to obtain the first image. In this way, the brightness of the adhesive tape in the first image may be close to that of the cell, thereby reducing the impact of the grayscale value of the adhesive tape area on the detection of the bottom support sheet and improving the accuracy of a cell detection result.

The contrast of the grayscale image is adjusted. For example, the grayscale value of each pixel in the first image may be calculated according to a preset linear equation y=kx+b, so as to achieve the effect of adjusting the contrast. x is a grayscale value before contrast adjustment, y is a grayscale value after contrast adjustment, and k and b are parameters to be adjusted, which may be set according to the actual situation.

The adjustment of the k value may directly affect the grayscale value of the first image. When k is less than 1, a difference between grayscale values of pixels can be reduced. When k is greater than 1, the difference between the grayscale values of the pixels can be increased. Therefore, this can achieve the effect of contrast adjustment. The adjustment of the b value affects the overall brightness of the first image. When b is greater than 0, the overall brightness of the first image can be increased, and when b is less than 0, the overall brightness of the first image can be reduced.

In the calculation, the grayscale value of each pixel may range from 0 to 255. When the grayscale value is 0, the pixel is black, and as the grayscale value is larger, the pixel is closer to white. When the calculated y is greater than 255, y is directly set to 255.

In this embodiment, since the adhesive tape is dark and has a small grayscale value, to make the grayscale value of the adhesive tape closer to the grayscale value of the cell, the k value may be increased so that a difference between the grayscale value of the adhesive tape and the grayscale value of the cell may be reduced.

Optionally, in some embodiments, the preprocessing the initial image to obtain the first image may further include the following steps:

splitting the initial image into three channels of images, where the three channels of images include a red channel image, a green channel image, and a blue channel image; and determining any channel image that meets a preset interference condition among the red channel image, the green channel image, and the blue channel image as the first image.

Figure 4A:
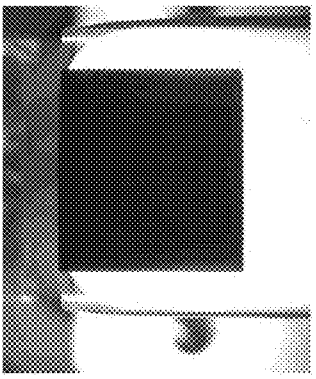
FIG. 4*a* is a schematic diagram of a red channel image in a cell detection method according to an embodiment of the present application.
Figure 4B:
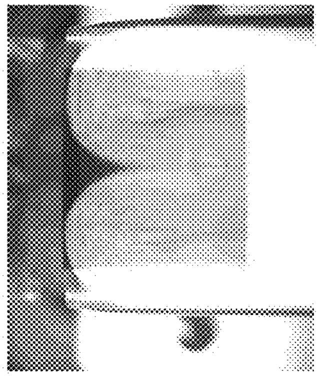
FIG. 4*b* is a schematic diagram of a green channel image in a cell detection method according to an embodiment of the present application.
Figure 4C:
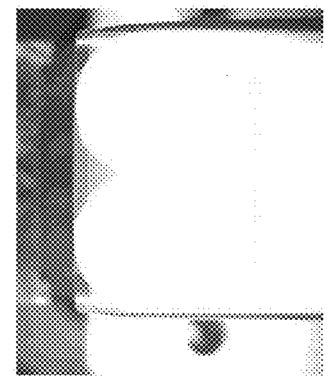
FIG. 4*c* is a schematic diagram of a blue channel image in a cell detection method according to an embodiment of the present application.

In this embodiment, the initial image obtained by the image acquisition apparatus by photographing the cell may be a color image. Referring to FIG. 4*a*, FIG. 4*b*, and FIG. 4*c*, the color initial image may be split into three single-channel images to obtain a red channel image, a green channel image, and a blue channel image. Then, a single-channel image that meets the preset interference condition may be determined as the first image. The preset interference condition may be determined based on the color of the adhesive tape.

For example, in existing cells, blue adhesive is usually used to package films. Therefore, the interference of the blue glue under the blue channel is the smallest, and the blue channel image may be selected as the first image to improve the accuracy of a cell detection result.

Optionally, in some embodiments, step 103 may include the following steps:

determining, based on the grayscale values corresponding to the pixels in the preset area in the first image, target pixels whose grayscale values meet a preset condition;

obtaining a target edge line by fitting the target pixels; and determining the detection result of the cell according to a number of target edge lines.

In this embodiment, the target pixel whose grayscale value meets the preset condition in the preset area may be determined, and then the target pixel is fit based on an existing straight line fitting algorithm, to obtain the target edge line. It may be understood that the number of target edge lines obtained by fitting may be zero, one, or multiple.

That the grayscale value of the target pixel meets the preset condition may be that the grayscale value of the target pixel is within a preset grayscale value range, or a difference between the grayscale value of the target pixel and a grayscale value of an adjacent pixel of the target pixel meets a preset difference condition, for example, is greater than or equal to a threshold. This is not specifically limited herein.

After the target edge line is obtained by fitting, it may be determined, according to the number of target edge lines, whether the cell includes a bottom support sheet. For example, if the number of target edge lines is 0, it may be considered that the cell includes no bottom support sheet. If the number of target edge lines is 2, it may be considered that the cell includes a bottom support sheet.

In this embodiment, the target pixel whose grayscale value meets the preset condition may be selected, the target edge line may be obtained by fitting the target pixels, and it may be determined, according to the number of the target edge lines, whether the cell includes a bottom support sheet. The detection process is simple and effectively saves computing resources and improves the efficiency of cell detection.

Optionally, in some embodiments, the determining, based on the grayscale values corresponding to the pixels in the preset area in the first image, target pixels whose grayscale values meet a preset condition may include the following steps:

dividing the preset area along an extension direction of the first edge line to obtain N sub-areas, where each sub-area includes M pixels, and N and M are integers greater than 1; and determining the target pixels from the M pixels in each sub-area, where a difference between a grayscale value of the target pixel and a grayscale value of an adjacent pixel of the target pixel is greater than or equal to a second threshold.

It may be understood that the brightness of the edge line is often different from that of a nearby area of the edge line. Therefore, a target pixel that may belong to the target edge line may be determined according to a difference between grayscale values of pixels.

Figure 5:
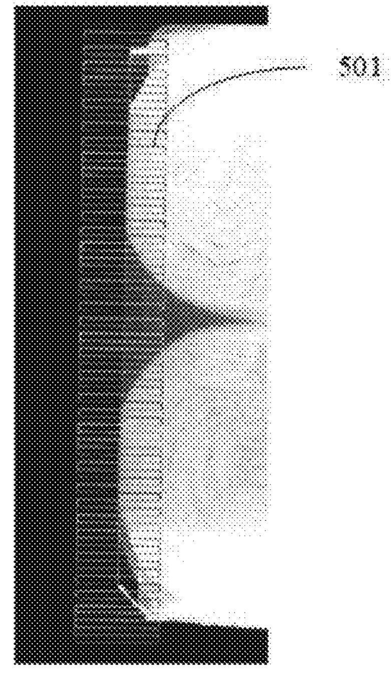
FIG. 5 is a schematic diagram of sub-areas in a cell detection method according to an embodiment of the present application.

In this embodiment, as shown in FIG. 5, the preset area may be divided into multiple sub-areas 501 along the extension direction of the first edge line, a difference between grayscale values of each pixel and an adjacent pixel of the pixel in each sub-area 501 may be calculated, and if the difference is greater than or equal to the second threshold, it may be considered that the pixel is the target pixel to which the target edge line belongs.

In this way, the preset area may be divided into multiple sub-areas, and the target pixel is selected according to a difference between grayscale values of pixels in each sub-area. The target pixel may be determined more accurately, so that the target edge line may be fit more accurately to further improve the accuracy of a cell detection result.

Optionally, in some embodiments, the obtaining a target edge line by fitting the target pixels may include the following steps:

obtaining pixel coordinates of the target pixels;

determining target pixels whose pixel coordinates meet a preset coordinate condition as second pixels; and when a number of second pixels is greater than or equal to a preset number threshold, obtaining the target edge line by fitting the second pixel.

In this embodiment, the coordinates of the target pixel may be obtained, and the target pixel whose pixel coordinates meet the preset coordinate condition is determined as the second pixel. The preset coordinate condition may be determined based on the first edge line, for example, an image coordinate system may be established based on the first edge line, and the Y axis in the image coordinate system may be parallel to the first edge line. In other words, the X-axis coordinates of each pixel on the first edge line are equal. Based on this, target pixels between which a difference in X-axis coordinates is smaller than a preset difference threshold may be determined as a group of second pixels.

It may be understood that the target pixels may include a group of second pixels, or may include multiple groups of second pixels.

Figure 6:
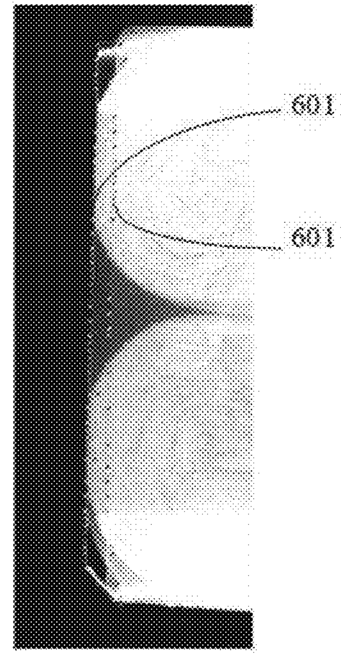
FIG. 6 is a schematic diagram of a target edge line in a cell detection method according to an embodiment of the present application.

As shown in FIG. 6, when a number of a group of second pixels is greater than or equal to the preset number threshold, a target edge line 601 may be obtained by fitting the group of second pixels. If a number of a group of second pixels is less than the preset number threshold, it may be considered that the pixels may be interference points and may be eliminated to improve the fitting accuracy of the target edge line, thereby improving the accuracy of cell detection.

In this embodiment, an interference item in the target pixel may be eliminated based on the pixel coordinates, so as to improve the fitting accuracy of the target edge line and further improve the accuracy of a cell detection result.

Optionally, in some embodiments, the determining the detection result of the cell according to a number of target edge lines may include the following steps:

determining, in a case that the number of target edge lines is 0, that the cell includes no bottom support sheet.

In this embodiment, if the number of target edge lines is 0, it may be considered that there is no edge line of the film and the bottom support sheet in the first image, and in this case, it may be considered that the cell includes no bottom support sheet. In this way, it may be directly determined, based on the number of target edge lines, whether the cell includes a bottom support sheet, the detection process is simple and convenient, and the computing power consumption is low and the efficiency is high.

Optionally, in some embodiments, the determining, in a case that the number of target edge lines is 0, that the cell includes no bottom support sheet may include the following steps:

inputting, in the case that the number of target edge lines is 0, the first image into a blur detection model to determine whether the first image is a blurry image; and determining, in a case that the first image is not a blurry image, that the cell includes no bottom support sheet.

It may be understood that the image captured by the image acquisition apparatus may be blurry during cell detection, which may subsequently affect the recognition of the target edge line. To further improve the accuracy of a cell detection result, in this embodiment, when the number of target edge lines is 0, the first image may be input into the blur detection model. The blur detection model may be pre-trained based on multiple blurry images and multiple clear images.

The blur detection model may be used to detect whether the input image is blurry. In other words, by inputting the first image into the blur detection model, it may be determined whether the first image is a blurry image.

If the first image is not a blurry image, it may be considered that the first image is clear, and the first image itself does not affect the recognition of the target edge line. Therefore, it may be considered that the result that the number of target edge lines is 0 is reliable. In this case, it may be determined that the cell includes no bottom support sheet.

Optionally, in some embodiments, after the inputting, in the case that the number of target edge lines is 0, the first image into a blur detection model to determine whether the first image is a blurry image, the cell detection method may further include the following steps:

re-obtaining the first image in a case that the first image is a blurry image.

In this embodiment, if it is detected that the first image is a blurry image, the first image may be re-obtained, and then the target edge line may be identified based on the re-obtained clear first image to obtain an accurate number of target edge lines, which can ensure the accuracy of a cell detection result.

Optionally, in some embodiments, the determining the detection result of the cell according to a number of target edge lines may include the following steps:

determining, in a case that the number of target edge lines is 2, that the cell includes a bottom support sheet.

It may be understood that since the film and the bottom support sheet are usually made of a same material, it is difficult to distinguish the film from the bottom support sheet. In this embodiment, it may be directly determined, based on the number of target edge lines, whether the cell includes a bottom support sheet.

In this embodiment, if the detected number of target edge lines is 2, it may be considered that one target edge line is an edge line of the film, and the other target edge line is an edge line of the bottom support sheet. In other words, it may be determined that the cell includes a bottom support sheet. In this way, it may be directly determined, based on the number of target edge lines, whether the cell includes a bottom support sheet, the detection process is simple and convenient, and the computing power consumption is low and the efficiency is high.

Optionally, in some embodiments, the determining, in a case that the number of target edge lines is 2, that the cell includes a bottom support sheet may include the following steps:

determining, in a case that the number of target edge lines is 2 and at least one target edge line is located in the first area, that the cell includes a bottom support sheet.

In this embodiment, in addition to the number of target edge lines, the position between the bottom support sheet and the cell may be also used to determine whether the cell includes a bottom support sheet, so as to further ensure the accuracy of a cell detection result. For example, when the number of target edge lines is 2 and at least one target edge line is located in the first area, it may be considered that the target edge line includes an edge line corresponding to the bottom support sheet. In this case, it may be determined that the cell includes a bottom support sheet.

Optionally, in some embodiments, in a case that the first image includes a first end of the cell, the determining a detection result of the cell according to the number of target edge lines may include the following steps:

obtaining a second image in a case that the number of target edge lines is 1, where the second image includes a second end of the cell, and the second end is opposite to the first end; and determining, in a case that the number of target edge lines in the second image is 1, that the cell includes no bottom support sheet.

In this embodiment, the first image may be an image obtained by the image acquisition apparatus by photographing the first end of the cell. When the number of target edge lines in the first image is 1, it may be considered that there are two cases: In one case, the cell includes no bottom support sheet, and the target edge line is an edge line corresponding to the film. In the other case, the cell includes a bottom support sheet, but the bottom support sheet is misplaced, causing the edge line of the bottom support sheet to coincide with the edge line of the film. As a result, only one target edge line is detected.

Based on this, in this embodiment, the second image may be obtained, where the second image is an image obtained by the image acquisition apparatus by photographing the second end of the cell, and the first end is opposite to the second end. Then, the detection method mentioned above may be used to detect the number of target edge lines in the second image.

If the number of target edge lines in the second image is also 1, it may be considered that the cell includes no bottom support sheet, and one target edge line is an edge line corresponding to the film.

In this embodiment, by detecting the number of target edge lines in the image at the other end of the cell, a case that the bottom support sheet is misaligned and cannot be detected may be eliminated, and the accuracy of a cell detection result is improved.

Optionally, in some embodiments, after the obtaining a second image in a case that the number of target edge lines is 1, the cell detection method may further include the following steps:

determining, in a case that the number of target edge lines in the second image is 2, that the cell includes a bottom support sheet.

In this embodiment, if the number of target edge lines in the second image is 2, it may be considered that the bottom support sheet of the cell is misaligned, that is, the cell includes a bottom support sheet.

In this embodiment, the number of target edge lines in the image at the other end of the cell may be detected, so that it may be more accurately determined, based on the numbers of target edge lines at both ends of the cell, whether the cell includes a bottom support sheet.

Based on the cell detection method provided in the above embodiments, the present application also provides an embodiment of a cell detection apparatus.

Figure 7:
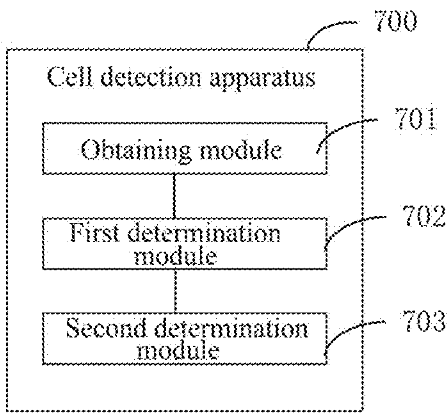
FIG. 7 is a schematic diagram of a structure of a cell detection apparatus according to another embodiment of the present application.

FIG. 7 is a schematic diagram of a structure of a cell detection apparatus according to another embodiment of the present application. For convenience of description, only parts related to this embodiment of the present application are shown.

Referring to FIG. 7, the cell detection apparatus 700 may include:

an obtaining module 701 configured to obtain a first image, where the first image includes a first area where a cell is located;

a first determination module 702 configured to determine a first edge line of the cell according to the first area; and a second determination module 703 configured to determine a detection result of the cell based on grayscale values corresponding to pixels in a preset area in the first image, where the detection result is used to indicate whether the cell includes a bottom support sheet, and the preset area is an area within a preset range from the first edge line.

In this embodiment of the present application, optionally, in some embodiments, the cell detection apparatus 700 may further include:

a third determination module configured to determine, according to grayscale values corresponding to pixels in the first image, first pixels whose grayscale values are greater than or equal to a first threshold; and a fourth determination module configured to determine a minimum bounding rectangle of the first pixels as the first area.

Optionally, in some embodiments, the obtaining module 701 may include:

an obtaining unit configured to obtain an initial image; and a preprocessing unit configured to preprocess the initial image to obtain the first image.

Optionally, in some embodiments, the preprocessing unit may be configured to: perform grayscale processing on the initial image to obtain a grayscale image; and adjust a contrast of the grayscale image to obtain the first image.

Optionally, in some embodiments, the preprocessing unit may further be configured to:

split the initial image into three channels of images, where the three channels of images include a red channel image, a green channel image, and a blue channel image; and determine any channel image that meets a preset interference condition among the red channel image, the green channel image, and the blue channel image as the first image.

Optionally, in some embodiments, the second determination module 703 may include:

a first determination unit configured to determine, based on the grayscale values corresponding to the pixels in the preset area in the first image, target pixels whose grayscale values meet a preset condition;

a fitting unit configured to obtain a target edge line by fitting the target pixels; and a second determination unit configured to determine the detection result of the cell according to a number of target edge lines.

Optionally, in some embodiments, the first determination unit may be configured to:

divide the preset area along an extension direction of the first edge line to obtain N sub-areas, where each sub-area includes M pixels, and N and M are integers greater than 1; and determine the target pixels from the M pixels in each sub-area, where a difference between a grayscale value of the target pixel and a grayscale value of an adjacent pixel of the target pixel is greater than or equal to a second threshold.

Optionally, in some embodiments, the fitting unit may be configured to:

obtain pixel coordinates of the target pixels;

determine target pixels whose pixel coordinates meet a preset coordinate condition as second pixels; and when a number of second pixels is greater than or equal to a preset number threshold, fit the second pixel to obtain a target edge line.

Optionally, in some embodiments, the second determination unit may be configured to:

determine, in a case that the number of target edge lines is 0, that the cell includes no bottom support sheet.

Optionally, in some embodiments, the second determination unit may further be configured to:

input, in the case that the number of target edge lines is 0, the first image into a blur detection model to determine whether the first image is a blurry image; and determine, in a case that the first image is not a blurry image, that the cell includes no bottom support sheet.

Optionally, in some embodiments, the obtaining module 701 may further be configured to:

re-obtain the first image in a case that the first image is a blurry image.

Optionally, in some embodiments, the second determination unit may be configured to:

determine, in a case that the number of target edge lines is 2, that the cell includes a bottom support sheet.

Optionally, in some embodiments, the second determination unit may further be configured to:

determine, in a case that the number of target edge lines is 2 and at least one target edge line is located in the first area, that the cell includes a bottom support sheet.

Optionally, in some embodiments, the obtaining module 701 may further be configured to:

obtain a second image in a case that the number of target edge lines is 1, where the first image includes a first end of the cell, the second image includes a second end of the cell, and the second end is opposite to the first end.

The second determination unit may further be configured to:

determine, in a case that the number of target edge lines in the second image is 1, that the cell includes no bottom support sheet.

Optionally, in some embodiments, the second determination unit may further be configured to:

determine, in a case that the number of target edge lines in the second image is 2, that the cell includes a bottom support sheet.

It should be noted that information exchange and execution processes of the above-mentioned apparatuses/units are based on the same idea as the method embodiments of the present application, and are apparatuses corresponding to the above-mentioned electrode plate detection method. All implementation manners of the above-mentioned method embodiments are all applicable to the apparatus embodiments, and specific functions and technical effects thereof may be found in the method embodiments, and will not be repeated herein.

Those skilled in the art can clearly understand that for the convenience and brevity of description, only the division of the above-mentioned functional units and modules is used for illustration. In practical applications, the above-mentioned functions may be assigned to different functional units and modules for implementation according to needs. That is, the internal structure of the apparatus is divided into different functional units or modules to complete all or a part of the functions described above. Each functional unit and module in the embodiments may be integrated into one processing unit, or each unit may exist separately physically, or two or more units may be integrated into one unit, and the integrated units may be implemented in the form of hardware or in the form of software functional units. In addition, specific names of the functional units and modules are only for the convenience of distinguishing each other, and are not used to limit the protection scope of the present application. For a specific working process of the units and modules in the above system, reference may be made to the corresponding process in the foregoing method embodiments, and details will not be repeated herein.

Figure 8:
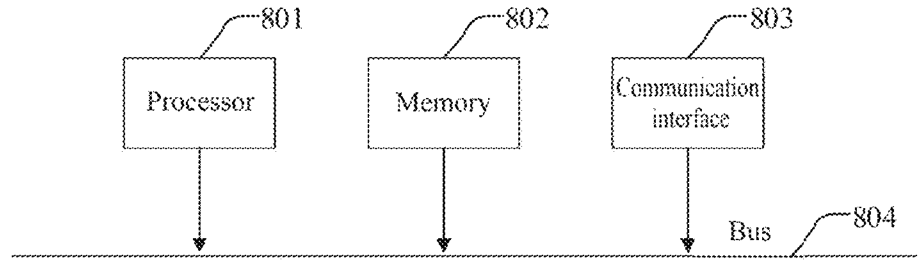
FIG. 8 is a schematic diagram of a structure of an electronic device according to still another embodiment of the present application.

FIG. 8 is a schematic diagram of a hardware structure of an electronic device according to still another embodiment of the present application.

The electronic device may include a processor 801 and a memory 802 storing programs or instructions. When the processor 801 executes the programs, the steps in any of the foregoing method embodiments are implemented.

Exemplarily, the programs may be divided into one or more modules/units, and one or more modules/units are stored in the memory 802 and executed by the processor 801 to complete the present application. One or more modules/units may be a series of program instruction segments capable of performing specific functions, and the instruction segments are used to describe the execution process of the program in the device.

Specifically, the processor 801 may include a central processing unit (CPU), or an application specific integrated circuit (Application Specific Integrated Circuit, ASIC), or may be configured as one or more integrated circuits to implement the embodiments of the present application.

The memory 802 may include a massive storage for data or instructions. For example and not limitation, the memory 802 may include a hard disk drive (Hard Disk Drive, HDD), a floppy disk drive, a flash memory, an optical disk, a magneto-optical disk, a magnetic tape, a universal serial bus (Universal Serial Bus, USB) drive, or a combination of two or more of the foregoing. In an appropriate case, the memory 802 may include a removable or non-removable (or fixed) medium. In an appropriate case, the memory 802 may be inside or outside a comprehensive gateway disaster recovery device. In a particular embodiment, the memory 802 is a non-volatile solid-state memory.

The memory may include a read-only memory (ROM), a random access memory (RAM), a magnetic disk storage medium device, an optical storage medium device, a flash storage device, and an electrical, optical, or another physical/tangible storage device. Thus, in general, the memory includes one or more tangible (non-transitory) readable storage media (for example, memory devices) encoded with software including computer-executable instructions, and when the software is executed (for example, by one or more processors), the software is operable to perform the operations described with reference to the method according to an aspect of the present disclosure.

The processor 801 implements any one of the methods in the foregoing embodiments by reading and executing programs or instructions stored in the memory 802.

In an example, the electronic device may further include a communication interface 803 and a bus 804. The processor 801, the memory 802, and the communication interface 803 are connected and complete mutual communication through a bus 804.

The communication interface 803 is mainly configured to implement communication between various modules, apparatuses, units and/or devices in the embodiments of the present application.

The bus 804 includes hardware, software or both, and couples components of the electrode plate detection apparatus to each other. By way of example and not limitation, the bus may include an accelerated graphics port (AGP) or other graphics buses, an enhanced industry standard architecture (EISA) bus, a front side bus (FSB), a hypertransport (HT) interconnect bus, an industry standard architecture (ISA) bus, an infinite bandwidth Interconnect bus, a low pin count (LPC) bus, a memory bus, a micro channel architecture (MCA) bus, a peripheral component interconnect (PCI) bus, a PCI-Express (PCI-X) bus, a serial advanced technology attachment (SATA) bus, a video electronics standards association local (VLB) bus, other suitable buses, or a combination of two or more of the foregoing. In an appropriate case, the bus 804 may include one or more buses. In the embodiments of the present application, a specific bus is described and shown, but any suitable bus or interconnection is considered in the present application.

In addition, in combination with the methods in the foregoing embodiments, the embodiments of the present application may provide a readable storage medium for implementation. Programs or instructions are stored on the readable storage medium. When the programs or instructions are executed by the processor, any method in the above-mentioned embodiments is implemented. The readable storage medium may be read by a machine such as a computer.

An embodiment of the present application further provides a chip, the chip includes a processor and a communication interface, the communication interface is coupled to the processor, and the processor is configured to run programs or instructions to implement each process of the embodiment of the foregoing method and the same technical effects can be achieved. To avoid repetition, details are not described herein again.

It should be understood that the chips mentioned in the embodiments of the present application may also be called a system-level chip, a system chip, a chip system, or a system-on-chip.

The embodiments of the present application provide a computer program product, the program product is stored in a readable storage medium, and the program product is executed by at least one processor to implement the various processes in the above method embodiments, and can achieve the same technical effect. To avoid repetition, details are not repeated herein.

It should be made clear that the present application is not limited to the specific configuration and processing described above and shown in the figures. For brevity, a detailed description of a known method is omitted herein. In the foregoing embodiments, several specific steps are described and shown as examples. However, the method process in the present application is not limited to the specific steps described and shown, and those skilled in the art can make various changes, modifications and additions, or change the sequence between the steps after understanding the spirit of the present application.

The functional modules shown in the above-mentioned structural block diagram may be implemented as hardware, software, firmware, or a combination thereof. When the functional modules are implemented as hardware, the functional modules may be, for example, an electronic circuit, an application-specific integrated circuit (ASIC), appropriate firmware, a plug-in, or a function card. When the functional modules are implemented as software, the elements of the present application are programs or code segments used to perform required tasks. The program or code segment may be stored in a machine-readable medium, or transmitted on a transmission medium or a communication link by means of a data signal carried in a carrier wave. "Machine-readable medium" may include any medium that may store or transmit information. Examples of machine-readable media include an electronic circuit, a semiconductor memory device, a ROM, a flash memory, an erasable ROM (EROM), a floppy disk, a CD-ROM, an optical disk, a hard disk, a fiber optic medium, a radio frequency (RF) link, and so on. The code segment may be downloaded via a computer network such as the Internet, intranet, and so on.

It should also be noted that in the exemplary embodiments mentioned in the present application, some methods or systems are described based on a series of steps or apparatuses. However, the present application is not limited to the sequence of the foregoing steps. In other words, the steps may be performed in the sequence mentioned in the embodiments, or performed in the sequence different from that in the embodiments, or a plurality of steps may be performed simultaneously.

All aspects of the present disclosure are described above with reference to a flowchart and/or block diagram of a method, a device (system), and a program product according to embodiments of the present disclosure. It should be understood that each block in the flowchart and/or block diagram and a combination of blocks in the flowchart and/or block diagram may be implemented by a computer program or instruction. These programs or instructions may be provided for a general-purpose computer, a dedicated computer, or a processor of another programmable data processing apparatus to generate a machine, so that when these instructions are executed by the computer or the processor of the another programmable data processing apparatus, specific functions/actions in one or more blocks in the flowcharts and/or in the block diagrams are implemented. The processor may be but is not limited to a general purpose processor, a dedicated processor, a special application processor, or a field programmable logic circuit. It should be further understood that each block in the block diagram or the flowchart and a combination of blocks in the block diagram or the flowchart may be implemented by using dedicated hardware that performs a specified function or operation, or may be implemented by using a combination of dedicated hardware and a computer instruction.

While the present application has been described with reference to a preferred embodiment, various modifications may be made thereto and equivalents may be substituted for components thereof without departing from the scope of the application, in particular, as long as there are no structural conflicts, the technical features mentioned in embodiments may be combined in any manner. The present application is not limited to the specific embodiments disclosed herein but includes all the technical solutions that fall within the scope of the claims.

The invention claimed is:

1. A cell detection method, comprising:

obtaining a first image, wherein the first image comprises a first area where a cell is located;

determining a first edge line of the cell based on the first area; and determining a detection result of the cell based on grayscale values corresponding to pixels in a preset area in the first image, wherein the detection result is configured to indicate whether the cell comprises a bottom support sheet, and the preset area is an area within a preset range from the first edge line, wherein the determining a detection result of the cell based on grayscale values corresponding to pixels in a preset area in the first image comprises:

determining, based on the grayscale values corresponding to the pixels in the preset area in the first image, target pixels whose grayscale values meet a preset condition;

obtaining a target edge line by fitting the target pixels; and determining the detection result of the cell based on a number of target edge lines, and wherein the determining, based on the grayscale values corresponding to the pixels in the preset area in the first image, target pixels whose grayscale values meet a preset condition comprises:

dividing the preset area along an extension direction of the first edge line to obtain N sub-areas, wherein each sub-area comprises M pixels, and N and M are integers greater than 1; and determining target pixels from the M pixels in each sub-area, wherein a difference between a grayscale value of the target pixel and a grayscale value of an adjacent pixel of the target pixel is greater than or equal to a second threshold.

2. The method according to claim 1, wherein after the obtaining a first image and before the determining a first edge line of the cell based on the first area, the method further comprises:

determining, based on grayscale values corresponding to pixels in the first image, first pixels whose grayscale values are greater than or equal to a first threshold; and determining a minimum bounding rectangle of the first pixels as the first area.

3. The method according to claim 1, wherein the obtaining a first image comprises:

obtaining an initial image; and preprocessing the initial image to obtain the first image.

4. The method according to claim 3, wherein the preprocessing the initial image to obtain the first image comprises:

performing grayscale processing on the initial image to obtain a grayscale image; and adjusting a contrast of the grayscale image to obtain the first image.

5. The method according to claim 3, wherein the preprocessing the initial image to obtain the first image comprises:

splitting the initial image into three channels of images, wherein the three channels of images comprise a red channel image, a green channel image, and a blue channel image; and determining any channel image that meets a preset interference condition among the red channel image, the green channel image, and the blue channel image as the first image.

6. The method according to claim 1, wherein the obtaining a target edge line by fitting the target pixels comprises:

obtaining pixel coordinates of the target pixels;

determining target pixels whose pixel coordinates meet a preset coordinate condition as second pixels; and when a number of second pixels is greater than or equal to a preset number threshold, obtaining a target edge line by fitting the second pixels.

7. The method according to claim 1, wherein the determining the detection result of the cell based on a number of target edge lines comprises:

determining, in a case that the number of target edge lines is 0, that the cell comprises no bottom support sheet.

8. The method according to claim 7, wherein the determining, in a case that the number of target edge lines is 0, that the cell comprises no bottom support sheet comprises:

inputting, in the case that the number of target edge lines is 0, the first image to a blur detection model to determine whether the first image is a blurry image; and determining, in a case that the first image is not a blurry image, that the cell comprises no bottom support sheet.

9. The method according to claim 8, wherein after the inputting, in the case that the number of target edge lines is 0, the first image to a blur detection model to determine whether the first image is a blurry image, the method further comprises:

re-obtaining the first image in a case that the first image is a blurry image.

10. The method according to claim 1, wherein the determining the detection result of the cell based on a number of target edge lines comprises:

determining, in a case that the number of target edge lines is 2, that the cell comprises a bottom support sheet.

11. The method according to claim 10, wherein the determining, in a case that the number of target edge lines is 2, that the cell comprises a bottom support sheet comprises:

determining, in a case that the number of target edge lines is 2 and at least one target edge line is located in the first area, that the cell comprises a bottom support sheet.

12. The method according to claim 1, wherein in a case that the first image comprises a first end of the cell, the determining the detection result of the cell based on a number of target edge lines comprises:

obtaining a second image in a case that the number of target edge lines is 1, wherein the second image comprises a second end of the cell, and the second end is opposite to the first end; and determining, in a case that the number of target edge lines in the second image is 1, that the cell comprises no bottom support sheet.

13. The method according to claim 12, wherein after the obtaining a second image in a case that the number of target edge lines is 1, the method further comprises:

determining, in a case that the number of target edge lines in the second image is 2, that the cell comprises a bottom support sheet.

14. An electronic device, comprising: a processor and a memory storing program instructions; and when the processor executes the program instructions, the method according to claim 1 is implemented.

15. A non-transitory readable storage medium, storing program instructions, wherein when the program instructions are executed by a processor, the method according to claim 1 is implemented.

16. A computer program product stored on a non-transitory removable medium, wherein when instructions in the computer program product are executed by a processor of an electronic device, the electronic device is caused to execute the method according to claim 1.

17. A cell detection apparatus, comprising:

circuitry configured to:

obtain a first image, wherein the first image comprises a first area where a first end of a cell is located;

determine a first edge line of the cell according to the first area; and determine a detection result of the cell based on grayscale values corresponding to pixels in a preset area in the first image, wherein the detection result is used to indicate whether the cell comprises a bottom support sheet, and the preset area is an area within a preset range from the first edge line, wherein the determining a detection result of the cell based on grayscale values corresponding to pixels in a preset area in the first image comprises:

determining, based on the grayscale values corresponding to the pixels in the preset area in the first image, target pixels whose grayscale values meet a preset condition:

obtaining a target edge line by fitting the target pixels; and determining the detection result of the cell based on a number of target edge lines, and wherein the determining, based on the grayscale values corresponding to the pixels in the preset area in the first image, target pixels whose grayscale values meet a preset condition comprises:

dividing the preset area along an extension direction of the first edge line to obtain N sub-areas, wherein each sub-area comprises M pixels, and N and M are integers greater than 1; and determining target pixels from the M pixels in each sub-area, wherein a difference between a grayscale value of the target pixel and a grayscale value of an adjacent pixel of the target pixel is greater than or equal to a second threshold.

* * * * *